United States Patent [19]

Lorenzen

[11] 4,220,164

[45] Sep. 2, 1980

[54] TOBACCO DISTRIBUTOR FOR CIGARETTE ROD MAKING MACHINES OR THE LIKE

[75] Inventor: Heinz-Christen Lorenzen, Hamburg, Fed. Rep. of Germany

[73] Assignee: Hauni-Werke Körber & Co. KG, Hamburg, Fed. Rep. of Germany

[21] Appl. No.: 795,559

[22] Filed: May 10, 1977

[30] Foreign Application Priority Data

May 14, 1976 [DE] Fed. Rep. of Germany ....... 2621410

[51] Int. Cl.² ........................... A24C 1/02; A24C 5/39
[52] U.S. Cl. ............................... 131/84 R; 131/21 A; 131/22 R; 131/109 R
[58] Field of Search ................ 131/21 R, 21 A, 22 R, 131/22 A, 110, 109 R, 96, 84 R, 84 B, 84 C, 58, 61 A, 61 B, 71, 72, 88, 109 AB; 198/524, 569

[56] References Cited

U.S. PATENT DOCUMENTS

| | | | |
|---|---|---|---|
| 3,996,944 | 12/1976 | Hinzmann | 131/109 R |
| 4,003,385 | 1/1977 | Adebahr et al. | 131/110 |
| 4,037,712 | 7/1977 | Wocknowski | 198/524 |
| 4,055,192 | 10/1977 | Berlin et al. | 131/84 B |

*Primary Examiner*—Vincent Millin
*Attorney, Agent, or Firm*—Peter Kontler

[57] ABSTRACT

An upright duct in the distributor of a cigarette rod making machine receives identical quantities per weight of tobacco particles per unit of time. The volume of the column of tobacco particles in the duct is monitored by two photoelectric cells which transmit signals to a speed regulating device for the motor which drives a carded drum below the outlet of the duct so that the drum removes more tobacco when the volume of the tobacco column in the duct increases and vice versa. The particles which are removed from the drum are converted into a sliver which is thereupon converted into a narrow tobacco stream. The volume of the tobacco column in the duct fluctuates due to unforeseen changes in the size, moisture content and/or temperature of tobacco particles. The mechanism which delivers tobacco particles to the duct includes a weighing device which receives particles from a magazine and from a source of short tobacco. An endless conveyor of the weighing device is driven at a variable speed in such a way that its speed increases when the weight of tobacco particles at its discharge end decreases and that its speed is reduced when the weight of tobacco particles at its discharge end decreases. This insures that the rate (per weight) at which the conveyor of the weighing device delivers tobacco particles to the duct remains constant.

7 Claims, 2 Drawing Figures

TOBACCO DISTRIBUTOR FOR CIGARETTE ROD MAKING MACHINES OR THE LIKE

BACKGROUND OF THE INVENTION

The present invention relates to apparatus for processing tobacco particles prior to conversion into the fillers of rod-shaped smokers' products, such as cigarettes, cigarillos or cigars. More particularly, the invention relates to improvements in apparatus (known as distributors) which are utilized to convert a mass of tobacco particles into a continuous and homogeneous layer which is ready for conversion into a tobacco stream or directly into the filler of a wrapped tobacco rod.

It is known to equip a tobacco distributor with a receptacle which stores a substantially constant supply of tobacco particles and from which the particles are evacuated for conversion into a relatively wide layer or sliver suitable for conversion into a continuous tobacco stream. Manufacturers or cigarettes or analogous rod-shaped smokers' products require that a maker (e.g., a cigarette making machine) produce a wrapped tobacco filler rod which can be subdivided into plain cigarettes whose weight matches or very closely approximates a predetermined norm. This can be achieved if the distributor is capable of forming a homogeneous layer of tobacco particles. As a rule, the layer is converted into a tobacco stream in such a way that the stream contains a surplus of tobacco particles. The surplus is removed by one or more trimming devices, and the thus equalized stream forms a filler which is ready for draping into cigarette paper or the like. The building of a satisfactory continuous layer of tobacco particles necessitates the provision of means for feeding tobacco particles at a constant rate to those components of the distributor which form the layer. In presently known distributors, such constancy of the rate of tobacco feed is accomplished by furnishing tobacco in excess of that which is needed to form the layer and by removing the surplus through the medium of paddle wheels, toothed rolls, brushes or like parts. This invariably results in comminution of a relatively high percentage of larger tobacco particles, i.e., in the making of so-called tobacco shorts and dust. Additional shorts are produced when the stream is equalized by one or more trimming devices. The shorts are normally mixed with tobacco which is to form the layer.

It has been found that the just described brushes, paddle wheels and like components are incapable of insuring that the layer forming equipment of a distributor invariably receives tobacco particles at a constant rate. Therefore, it is necessary to supply to the distributor tobacco particles at a rate well in excess of the requirements of the layer-forming equipment so that the percentage of shorts is very high. The presence of shorts in cigarettes or analogous rod-shaped smokers' products is undesirable (such shorts are admitted solely for the purpose of reducing the cost of smokers' products) because they adversely affect the quality of the ultimate product. Thus, the presence of shorts renders it difficult to adequately control the density and/or fullness of the filler. Moreover, the shorts are likely to escape at the ends of cigarettes so that such cigarettes often fail to pass the testing station which monitors the density of cigarette ends and causes segregation of cigarettes whose ends are too soft. Moreover, escaping tobacco shorts are annoying to the smokers', especially to smokers of plain cigarettes; furthermore, the shorts contaminate the testing equipment, the interior of a cigarette pack or the pocket or handbag of the purchaser.

OBJECTS AND SUMMARY OF THE INVENTION

An object of the invention is to provide a novel and improved apparatus for the making of layers of tobacco particles (preparatory to conversion of such layers into streams or rod-like fillers of tobacco) in such a way that the particles are subjected to negligible comminuting action even if certain of their characteristics (such as size, temperature and/or moisture content) fluctuate within a rather wide range.

Another object of the invention is to provide a novel and improved distributor which can produce a homogeneous layer of tobacco particles even though it receives tobacco at a rate which equals or only slightly exceeds the optimum rate.

A further object of the invention is to provide a distributor which can produce a homogeneous and uniform tobacco layer even if the rate at which it receives tobacco fluctuates for reasons that are beyond the control of the attendants.

An additional object of the invention is to provide novel and improved means for converting a variable-volume supply of tobacco particles into a continuous homogeneous layer or sliver of tobacco particles.

An ancillary object of the invention is to provide the distributor with novel and improved means for removing identical quantities per volume from a supply of tobacco particles whose volume fluctuates or is likely to fluctuate at an unpredictable rate.

The invention is embodied in an apparatus for forming a continuous layer or sliver of tobacco particles in a machine for the production of rod-shaped smokers' products, particularly in a distributor for cigarette rod making machines. The apparatus comprises a receptacle (e.g., an upright duct), means for supplying tobacco particles into the receptacle at a substantially constant rate per weight (the supplying means may comprise a tobacco weighing device having a variable-speed conveyor and means for feeding a continuous layer of tobacco particles to the conveyor of the weighing device), an adjustable carded drum or analogous means for evacuating tobacco particles from the receptacle, one or more photoelectric cells or analogous level indicating means for monitoring the volume of the supply of tobacco particles in the receptacle, and means for adjusting the evacuating means when the monitored volume of the supply of particles in the receptacle deviates from a predetermined range. The adjusting means may comprise a variable-speed prime mover and means for regulating speed of the prime mover as a function of indications furnished by the level indicating means. If the receptacle is an upright duct, the level indicating means preferably comprises an upper and a lower level indicator, and the regulating means then preferably comprises means (e.g., a suitable electric or electronic circuit) for operating the prime mover at an average speed when the indications furnished by the level indicators denote a supply of tobacco particles whose volume is between a predetermined minimum value and a predetermined maximum value, at a higher second speed when the volume of the supply equals or exceeds the maximum value, and at a lower third speed when the volume of the supply equals or is less than the minimum value.

The particles which are removed by the evacuating means are thereupon converted into a carpet or layer, and the layer is converted into a narrow stream of tobacco particles, e.g., into a stream which can be draped into cigarette paper to form therewith a continuous cigarette rod.

The novel features which are considered as characteristic of the invention are set forth in particular in the appended claims. The improved distributor itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
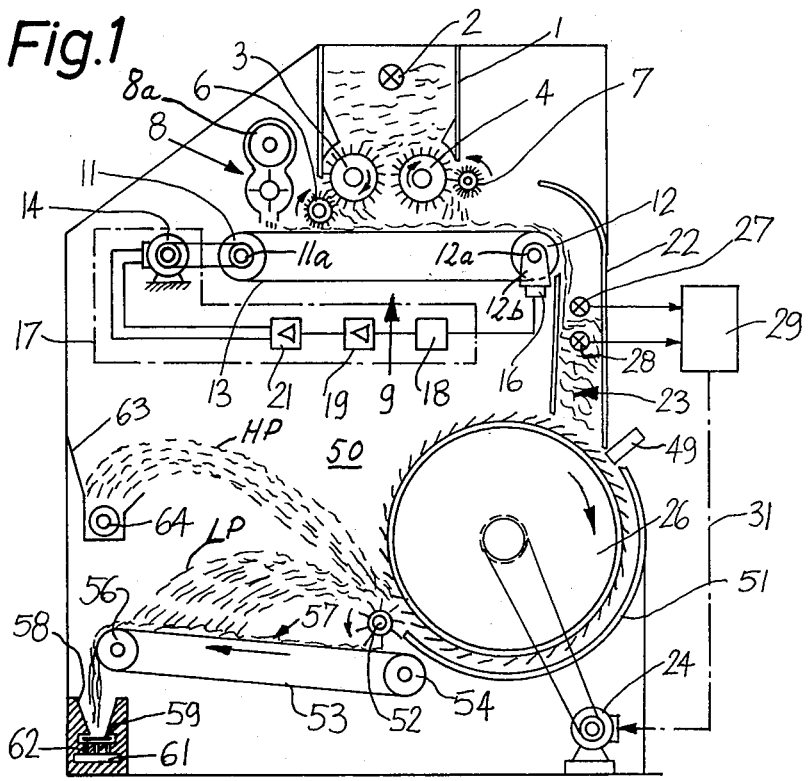
FIG. 1 is a schematic sectional view of a distributor which embodies the invention and which is installed in a cigarette making machine.

FIG. 1 shows a distributor which comprises a magazine or bin 1 for a main supply of tobacco particles. The particles constitute a mixture of tobacco shreds and fragments of ribs, stem, birds' eyes and eventually pieces of metal or other foreign matter. The upper level of the main supply of tobacco particles in the magazine 1 is monitored by a detector 2 (e.g., a photoelectric cell) which transmits signals to a pneumatic conveyor (not shown) to start or interrupt the admission of particles so as to insure that the upper level of material in the magazine fluctuates very little or not at all.

The lower end of the magazine 1 is open and is disposed above two rotary tobacco withdrawing members 3 and 4 each of which is a roll or drum having radially extending needles or analogous projections. The withdrawing members 3, 4 respectively cooperate with rapidly rotating picker rollers 6, 7 which expel the particles from the carding of the member 3, 4 and propel the particles onto the upper reach of an endless conveyor belt 13 trained over pulleys 11 and 12. The pulley 11 is rotatable about the axis of a fixed shaft 11a which is driven by a variable-speed electric motor 14. The shaft 12a of the pulley 12 is mounted in a bracket 12b resting on a weight sensor 16 which, together with the conveyor belt 13, forms part of a weighing or metering device 9. The sensor 16 transmits signals to the transducer 18 of a speed regulating unit 17 for the motor 14 to insure that the discharge (right-hand) end of the conveyor belt 13 delivers uniform tobacco quantities per weight (per unit of time) into an upright receptacle or duct 22. The speed regulating unit 17 further comprises a preamplifier 19 and an output amplifier 21 (preferably a thyristorized amplifier) whose output transmits signals to the motor 14. The sensor 16 may comprise a pointer which indicates the weight of successive increments of tobacco descending into the duct 22. The transducer 18 converts mechanical (or pneumatic) signals furnished by the sensor 16 into electrical signals which are amplified by 19 and 21 to be used for adjustment of the speed of the motor 14 in dependency on deviations of desired weight from the actual or measured weight. The motor 14 is preferably a D.C. motor and the output of the amplifier 21 then transmits a D.C. signal. Output amplifiers of the type suitable for use in the speed regulating unit 17 are known as "MINISEMI" (produced by the West German Firm AEG).

The distributor further comprises an air lock 8 which receives tobacco shorts from a suitable source (not shown) by way of a feed screw 8a and delivers shorts, at a constant rate, to the upper reach of the conveyor belt 13 upstream of the outlet of the magazine 1.

The volume of the intermediate supply or column 23 of tobacco particles in the duct 22 is monitored by the level indicators 27, 28 each of which preferably constitutes a photoelectric cell. The transducers of these cells are operatively connected to the inputs of a speed regulator 29 for a variable-speed electric motor 24 which drives a tobacco evacuating member here shown as a rotary carded drum 26. The carding of the drum 26 travels along an endless path a portion of which is located below the open lower end of the duct 22. The operative connection between the speed regulator 29 and the motor 24 is indicated by the phantom line 31. The upper level indicator 27 transmits signals or indications which cause the regulator 29 to increase the speed of the motor 24 when the volume of tobacco particles in the duct 22 reaches a maximum permissible value. The lower level indicator 28 transmits signals or indications when the volume of tobacco particles in the duct 22 decreases to the lowermost permissible value whereby the regulator 29 reduces the speed of the motor 24 to thus reduce the rate of evacuation of tobacco particles from the duct.

Figure 2:
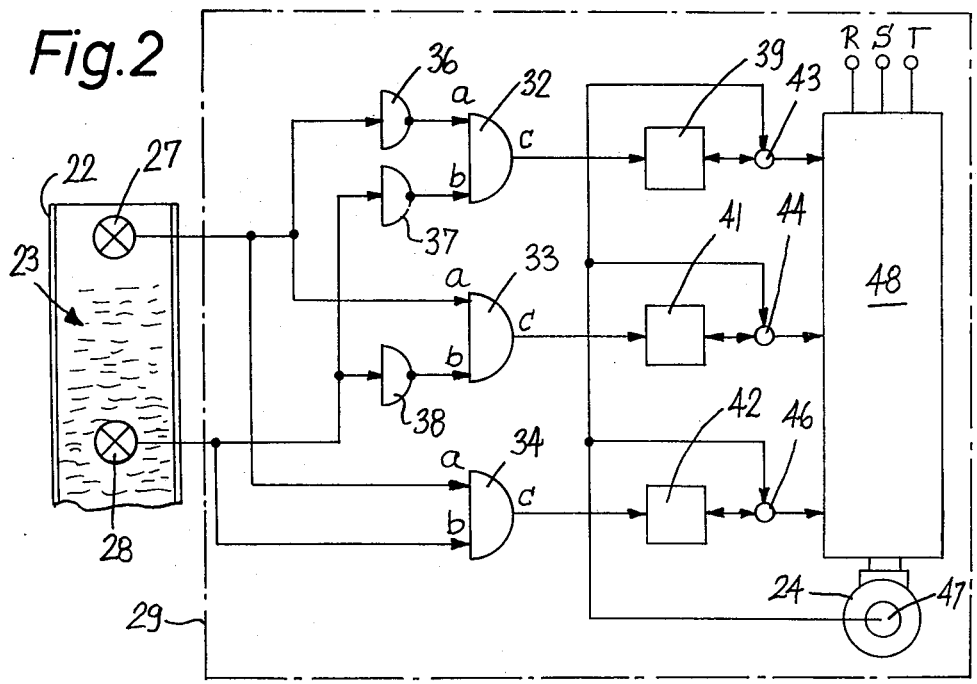
FIG. 2 is a circuit diagram of the means for adjusting the tobacco evacuating means of the distributor shown in FIG. 1.

The construction of the speed regulator 29 is shown in FIG. 2. A first AND-gate 32 has inputs a and b which are respectively connected with the transducers of the level indicators 27, 28 by inverters (NO-gates) 36, 37. The inputs a and b of a second AND-gate 33 are respectively connected to the transducer of the level indicator 27 and to the transducer of the level indicator 28 (the connection between 28 and input b of the gate 33 comprises a third inverter 38). The inputs a and b of a third AND-gate 34 are directly connected to the transducers of the level indicators 27, 28. The outputs c of the gates 32, 33, 34 are respectively connected with the corresponding inputs of three sources 39, 41, 42 of reference signals (each such source may constitute an adjustable potentiometer), and the outputs of the sources 39, 41, 42 are respectively connected with the corresponding inputs of three signals comparing junctions 43, 44 and 46. Each junction has a second input which is connected with the output of an RPM monitoring device 47 (e.g., a tachometer generator) which is operatively associated with the output shaft of the motor 24 for the evacuating drum 26. The outputs of the junctions 43, 44 and 46 are connected to the corresponding inputs of a speed changing unit 48 for the motor 48. The unit 48 is preferably a thyristorized amplifier, e.g., a "MINISEMI".

The intensity or another characteristic of the reference signal supplied by the source 39 is indicative of a relatively high speed of the motor 24. The intensity of signal which is furnished by the source 41 is indicative of a median or average motor speed, and the intensity of reference signal which is furnished by the source 42 is indicative of a relatively low motor speed. The output of the speed changer 48 transmits a D.C. signal because the motor 24 is assumed to be a variable-speed D.C. motor.

The carding of the evacuating drum 26 transports a layer of tobacco particles past a homogenizing device 49 of the type disclosed in commonly owned U.S. Pat. No. 3,996,944 granted Dec. 14, 1976 to Alfred Hinzmann. The device 49 is located downstream of the outlet of the duct 22 and includes a barrier which is reciprocable at right angles to the plane of FIG. 1. The barrier is parallel to and extends along the full axial length of the drum 26. Its purpose is to uniformly distribute the particles in the carding of the drum 26 and to intercept the surplus.

The homogenizing device 49 is followed by a baffle or trough 51 which spacedly surrounds the carding of the drum 26 along an arc of approximately 180 degrees. A rapidly rotating picker roller 52 is mounted at the discharge end of the channel between the drum 26 and trough 51 to expel the homogeneous layer of tobacco particles from the carding and to propel the expelled particles into a classifying chamber 50. The flight spans of acceptable (lighter) particles LP are shorter, and such particles land on the upper reach of a wide conveyor band 53 which is trained over pulleys 54, 56 and is driven to advance in the direction indicated by arrow. The particles LP form a wide layer or sliver 57 which is discharged into a narrow elongated tobacco channel 58 extending at right angles to the plane of FIG. 1. The descending particles LP form a growing narrow tobacco stream which accumulates on the upper reach of a foraminous belt conveyor 59. The upper reach of the conveyor 59 travels above the perforated top wall 62 of a stationary suction chamber 61 which attracts the growing stream to the conveyor 59. The fully grown stream is equalized (if necessary) by a suitable trimming device and is transported into a wrapping mechanism to be draped into a web of cigarette paper. The resulting continuous cigarette rod is severed by a cutoff (not shown) to yield a file of plain cigarettes of unit length or multiple unit length.

The flight spans of heavier tobacco particles HP in the classifying chamber 50 are longer than the flight spans of particles LP; therefore, the particles HP overshoot the upper reach of the band 53 and accumulate in an intercepting vessel 63 to be evacuated, either continuously or at necessary intervals, by a feed screw 64. The heavier particles HP can be fed to a device for making reconstituted tobacco sheets. Such heavier particles consist mainly of comminuted tobacco ribs. Segregation of particles HP from the lighter particles LP is desirable because a fragment of a tobacco rib would be likely to puncture the cigarette paper web.

The operation:

The withdrawing members 3, 4 cooperate with the associated picker rollers 6, 7 to deliver to the conveyor belt 13 a finely distributed mixture of lighter and heavier tobacco particles. Such mixture forms a continuous layer and is advanced toward and beyond the pulley 12 to descend into the duct 22. The feed screw 8a delivers tobacco dust and shorts from a collecting receptacle, not shown, which in turn receives such material from a pneumatic system of the cigarette making machine. The pneumatic system (several presently preferred forms of which is disclosed in the commonly owned copending application Ser. No. 515,440 filed Oct. 16, 1974 now U.S. Pat. No. 4,055,192 by Herbert Berlin) collects shorts and dust from various units of the cigarette maker and segregates the collected material from the gaseous carrier medium for reintroduction into the distributor of FIG. 1 via feed screw 8a and air lock 8.

The device 9 weighs successive increments of the layer which is fed into the duct 22 and its sensors 16 transmits corresponding signals to the transducer 18 of the speed regulating unit 17 for the motor 14. This insures that the rate (per weight) at which the duct 22 receives a mixture of lighter and heavier tobacco particles remains constant or fluctuates within a rather narrow range. Nevertheless, the volume of the column 23 of tobacco in the duct 22 is likely to fluctuate, particularly owing to changes in temperature, moisture content and/or size of tobacco particles.

The speed regulator 29 insures that the carded drum 26 evacuates tobacco at a constant rate, i.e., that the carding of the drum 26 withdraws equal volumes of tobacco particles per unit of time. To this end, the level indicators 27, 28 in the duct 22 cooperate with other components of the speed regulator 29 in the following way:

If the upper level of tobacco column 23 in the duct 22 is located between the levels of the indicators 27 and 28, the motor 24 drives the drum 26 at a median or average speed. The light source of the upper level indicator 27 transmits a beam of light which reaches the associated transducer as long as the upper level of the column 23 in the duct 22 is below the level of the indicator 27. The transducer of the level indicator 27 transmits signals to the inverter 36 and to the inputs a of the AND-gates 33 and 34. The light beam between the light source and the transducer of the lower level indicator 28 is interrupted by the column 23 of tobacco particles in the duct 22; therefore the transducer of the level indicator 28 does not transmit a signal to the inverters 37, 38 and to the input b of the AND-gate 34. The input a of the AND-gate 32 does not receive a signal (because the input of the inverter 36 receives a signal); however, the input b of the AND-gate receives a signal from the inverter 37 because the input of the inverter 37 does not receive a signal from the transducer of the lower level indicator 28. Therefore, the output c of the AND-gate 32 does not transmit a signal and the source 39 of reference signals does not transmit a signal to the junction 43. Thus, the uppermost input of the speed changing unit 48 of FIG. 1 is without a signal.

The output c of the AND-gate 33 transmits a signal to the associated source 41 of reference signals because the input a of the gate 33 receives a signal from the transducer of the level indicator 27 and the input b of the gate 33 receives a signal since the input of the associated inverter 38 does not receive a signal from the transducer of the level indicator 28. The output of the source 41 transmits a signal to the junction 44 which also receives a signal from the tachometer generator 47. The median input of the speed changing unit 48 receives a signal which causes the motor 24 to drive the carded drum at a median speed. Eventual deviations of the actual speed from average speed are eliminated by the junction 44 which compares the reference signal (from the source 41) with the signal transmitted by the tachometer generator 47.

The output c of the AND-gate 34 does not transmit a signal because, though its input a receives a signal from the upper level indicator 27, the input b does not receive a signal from the lower level indicator 28. Thus, the lowermost input of the unit 48 is without a signal.

If the upper level of the column 23 in the duct 22 begins to rise (for one or more of the aforementioned reasons), and the tobacco particles interrupt the light beam between the light source and transducer of the level indicator 27, the output c of the AND-gate 32 begins to transmit a signal which causes the source 39 and junction 43 to energize the uppermost input of the unit 48 so that the motor 24 begins to drive the drum 26 at a higher speed and the carding of the drum 26 removes a larger quantity of tobacco particles per unit of time. The output c of the AND-gate 33 ceases to transmit a signal because its input a does not receive a signal from the transducer of the level indicator 27. The output c of the AND-gate 34 also fails to transmit a signal because neither of its inputs a and b receives a signal. The volume of tobacco in the duct 22 begins to decrease and, when the beam issuing from the light source of the upper level indicator 27 is again free to reach the associated transducer, the signal at the output c of the AND-gate 32 disappears and the output c of the AND-gate 33 begins to transmit a signal to the source 41 of reference signals. The output c of the AND-gate 34 is still unable to transmit signals to the associated source 42. Therefore, the motor 24 is again driven at the aforementioned median or average speed.

If the volume of the column 23 of tobacco particles in the duct 22 is reduced to such an extent that the upper level of tobacco descends below the lower level indicator 28, the inverters 36 and 37 receive signals (i.e., there is no signal at the output of the gate 32), the output c of the gate 33 ceases to transmit a signal because its input b does not receive a signal from the transducer of the level indicator 28, but the output c of the gate 34 begins to transmit signals to the source 42 so that the motor 24 is driven at a relatively low speed whereby the volume of tobacco supply in the duct 22 begins to rise. When the level indicator 28 is again buried in tobacco, the signal at the output c of the gate 34 disappears and the gate 33 causes the unit 48 to operate the motor 24 at the average speed.

The distributor can be modified in a number of ways without departing from the spirit of the invention. For example, the weighing device 9 could be replaced with a conventional weighing device which transmits signals denoting the weight of the entire layer of tobacco thereon. Such signals are utilized to regulate the rate of tobacco feed to the weighing device. The structure which is shown in the drawing is preferred at this time because it is more reliable and less complex. All that is necessary is to regulate the rate of speed of the conveyor belt 13; this insures that the rate (per weight) at which the duct 22 receives tobacco particles remains constant even if the feeding unit including the magazine 1, the withdrawing members 3, 4, the picker rollers 6, 7 and the air lock 8 fails to deliver tobacco particles at a predictable rate. However, it has been found that the just enumerated component parts of the feeding unit are capable of supplying tobacco particles at a rather predictable rate so that the speed of the conveyor belt 13 need not be varied within a wide range. The picker rollers 6 and 7 normally cause the particles which are delivered by the withdrawing members 3, 4 to form a continuous and uniform layer on the upper reach of the belt 13. The admixture of tobacco shorts to particles which are fed by the picker rollers 6 and 7 is desirable because, by adding the shorts at or very close to the inlet of the distributor, such shorts have ample time to be uniformly mixed with other particles to insure that they cannot unduly influence the density and/or fullness of the filler which is obtained in response to trimming of the tobacco stream on or downstream of the conveyor 59.

An advantage of the improved distributor is that it invariably processes all of the tobacco particles which are fed to the duct 22 at a constant rate per weight. In other words, the weight of tobacco which is converted into the carpet 57 (plus the weight of tobacco which enters the vessel 63) per unit of time invariably equals or very closely approximates the weight of tobacco particles which the duct 22 receives from the conveyor belt 13 during the same interval of time. Otherwise stated, the distributor eliminates the possibility of long-range deviations of the volume of processed tobacco from an optimum volume, even if the size, temperature and/or moisture content of tobacco particles changes while the distributor is in operation. The device 9 cannot discriminate between deliveries of dry or wet tobacco, between deliveries of hot or cool tobacco and/or between deliveries of smaller or larger tobacco particles. However, the resulting changes in volume of the column 23 are detected by the level indicators 27, 28 which insure that the weight of tobacco issuing from the duct 22 per unit of time remains constant.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

What is claimed is:

1. In an apparatus for forming a continuous layer of tobacco particles in a machine for the production of cigarettes or the like, the combination of a receptacle; means for supplying tobacco particles into said receptacle at a substantially constant rate per weight including a weighing device and means for feeding tobacco particles to said weighing device, said weighing device including a conveyor arranged to deliver to said receptacle equal quantities per weight of tobacco particles per unit of time and means for varying the speed of said conveyor as a function of changes in the rate of tobacco feed; adjustable means for evacuating tobacco particles from said receptacle; means for monitoring the volume of the supply of tobacco particles in said receptacle; and means for adjusting said evacuating means when the monitored volume of the supply of particles in said receptacle deviates from a predetermined range.

2. The combination of claim 1, wherein said receptacle is an upright duct.

3. The combination of claim 1, wherein said monitoring means comprises an upper and a lower level indicator for the supply of tobacco particles in said receptacle, said evacuating means comprising a rotary evacuating member and said adjusting means comprising a variable-speed prime mover for said rotary member and means for regulating the speed of said prime mover as a function of indications furnished by said level indicators.

4. The combination of claim 3, wherein each of said level indicators comprises a photoelectric cell.

5. The combination of claim 3, wherein said regulating means includes means for operating said prime mover at an average speed when the indications furnished by said level indicators denote a supply of tobacco particles whose volume is between a predetermined maximum and a predetermined minimum value, at a higher second speed when the volume of said supply equals or exceeds said maximum value, and at a lower third speed when the volume of said supply equals or is less than said minimum value.

6. The combination of claim 1, wherein said feeding means comprises a magazine for a substantially constant supply of tobacco particles and means for transferring a substantially uniform layer of tobacco particles from said magazine onto said conveyor.

7. The combination of claim 1, wherein said particles include short tobacco, and further comprising means for feeding short tobacco to said tobacco supplying means at a substantially constant rate.

* * * * *